United States Patent
Aceron et al.

(10) Patent No.: US 11,652,857 B2
(45) Date of Patent: May 16, 2023

(54) COMPUTERIZED SYSTEM AND METHOD FOR VIDEO CONFERENCING PRIORITY AND ALLOCATION USING MOBILE EDGE COMPUTING

(71) Applicant: Verizon Patent and Licensing Inc., Basking Ridge, NJ (US)

(72) Inventors: John Aceron, Chantilly, VA (US); Rohit Shirish Saraf, Nashua, NH (US); Bhumip Khasnabish, Lexington, MA (US); Serhad Doken, Bryn Mawr, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 62 days.

(21) Appl. No.: 17/117,274

(22) Filed: Dec. 10, 2020

(65) Prior Publication Data

US 2022/0191257 A1    Jun. 16, 2022

(51) Int. Cl.
*H04L 65/403* (2022.01)
*G06F 3/04842* (2022.01)
(Continued)

(52) U.S. Cl.
CPC ........ *H04L 65/403* (2013.01); *G06F 3/04842* (2013.01); *G06F 3/165* (2013.01); *H04N 7/15* (2013.01)

(58) Field of Classification Search
CPC ... H04L 65/403; G06F 3/04842; G06F 3/165; H04N 7/01
See application file for complete search history.

(56) References Cited

U.S. PATENT DOCUMENTS 7,330,541 B1 * 2/2008 Surazski ................. H04M 3/56
 379/202.01
8,290,134 B2 * 10/2012 Jaiswal ................. H04M 3/566
 379/202.01
(Continued)

FOREIGN PATENT DOCUMENTS

EP          3135032 A4 * 12/2017   ......... H04L 12/1813
JP       2007096555 A   *  4/2007
WO    WO-2015172435 A1 * 11/2015   ............. H04M 3/56

OTHER PUBLICATIONS

A Method to Avoid Simultaneous Talk During Online Meetings, Nov. 18, 2020, 7 pages (Year: 2020).*
(Continued)

*Primary Examiner* — Yongjia Pan (57) ABSTRACT

Disclosed are systems and methods for improving interactions with and between computers in content providing, streaming and/or hosting systems supported by or configured with devices, servers and/or platforms. The disclosed systems and methods provide a novel conference framework that automatically determines and prioritizes speaker allocation within a conference in order to remedy and/or avoid conflicts between speakers so that a clear and decisive dialog can occur. The disclosed conference framework balances a determined weighting factor and queue management ranking of the conference to provide a prioritized speaker queue that enables all participants to speak without conflict or interruption. The disclosed systems and methods enable a prioritized, conflict-resolution based conferencing environment where orderly conferencing can occur while maintaining each participants rights to participate accordingly.

19 Claims, 7 Drawing Sheets

(51) Int. Cl.
*G06F 3/16* (2006.01)
*H04N 7/15* (2006.01)

(56) References Cited

U.S. PATENT DOCUMENTS

| | | | | |
|---|---|---|---|---|
| 8,447,023 B2* | 5/2013 | Nimri | ...................... | H04M 3/42 370/266 |
| 8,739,045 B2* | 5/2014 | Pang | ...................... | H04N 7/152 715/753 |
| 10,057,426 B2* | 8/2018 | Waugh | ................ | H04L 12/1822 |
| 11,093,903 B2* | 8/2021 | Bastide | ............ | G06Q 10/06312 |
| 2003/0185371 A1* | 10/2003 | Dobler | .................. | H04M 1/247 379/207.02 |
| 2007/0165820 A1* | 7/2007 | Krantz | .................. | H04M 7/006 379/202.01 |
| 2007/0201659 A1* | 8/2007 | Altberg | ............. | H04M 3/42008 379/201.01 |
| 2007/0263821 A1* | 11/2007 | Shaffer | ............. | H04M 3/42187 379/202.01 |
| 2011/0187814 A1* | 8/2011 | Nimri | ...................... | G10L 21/00 704/E21.001 |
| 2012/0226997 A1* | 9/2012 | Pang | .................... | H04L 12/1818 715/753 |
| 2013/0176910 A1* | 7/2013 | Gorti | ...................... | H04M 3/568 370/260 |
| 2015/0304366 A1* | 10/2015 | Bader-Natal | ........ | H04L 12/1813 348/14.03 |
| 2016/0149968 A1* | 5/2016 | Yin | ...................... | H04L 65/4038 709/204 |
| 2017/0353508 A1* | 12/2017 | Yoakum | .............. | H04L 65/4038 |
| 2018/0286388 A1* | 10/2018 | Kawachi | ................ | H04L 65/403 |

OTHER PUBLICATIONS

Smart, automatic sequencing of multiple simultaneous conversations in a conference, Jul. 16, 2010, 3 pages (Year: 2010).*

* cited by examiner

COMPUTERIZED SYSTEM AND METHOD FOR VIDEO CONFERENCING PRIORITY AND ALLOCATION USING MOBILE EDGE COMPUTING

BACKGROUND INFORMATION

The disclosed embodiments are related to conferencing systems and connecting remote users via a conferencing application executing on the users' computing devices.

BRIEF DESCRIPTION OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION OF EXAMPLE EMBODIMENTS

The disclosed embodiments provide a novel framework for prioritizing and allocating speakers during a remote conference using mobile-edge computing (MEC) functionality.

In conventional remote conferencing systems, users are virtually brought together within a digital environment where they are able to communicate with one another with audio and/or video the terms remote conferencing and conferencing are used interchangeably herein). However, existing conference systems, both audio and audio/video systems, fail to include any type of functionality or capability for preventing and addressing conflicts between speakers. That is, when one user is speaking, there is no system or known application that prevents that user from being interrupted by another user. Moreover, there is no system that performs "conflict resolution" between two users that are attempting to speak at the same time.

Conventional conferencing technology is essentially configured as a "free-for-all" where participants must individually figure out the hierarchy of who is currently speaking and who is next so as not to interrupt other users, and act accordingly in the hopes that they get their chance to speak without being interrupted.

To solve the aforementioned problems, the disclosed systems and methods provide a novel conferencing framework that automatically determines and prioritizes speaker allocation within the remote conference, which identifies and remedies conflicts between participants so that a clear and decisive dialog can occur.

The discussion herein will focus on video conferencing as the exemplary conferencing application; however, it should not be construed as limiting, as any type of conferencing application, platform or service can be utilized without departing from the scope of the instant application. For example, the disclosed conferencing framework can be implemented within an audio conference call, within a chat room, and the like, in a similar manner as discussed herein.

The disclosed framework balances a determined weighting factor and queue management ranking of a conference to provide a prioritized speaker queue that enables participants to speak without conflict or interruption. In illustrative embodiments, the disclosed systems and methods utilize MEC, as discussed and illustrated below in relation to FIG. 1.

According to some embodiments, the disclosed framework first leverages the MEC's processing and low latency in order to provide a weighting allocation. The allocation is based on weight and queue management ranking calculations, which as discussed below in relation to at least FIG. 4, can be based on multiple pre-determined and/or dynamically determined participant factors such as, but not limited to: pre-call role priority weight; activity fairness weighting; "non-winning" or lower ranked speaker value; host override; voice quality weight; attention metric weights; relevance metrics; "hand raised" or other notifications of a request to speak; inactivity or non-usage of speaking opportunities, and the like, or some combination thereof.

In some embodiments, the disclosed framework, upon performing the weighting factor determination, then performs the ranking (e.g., the queue ranking management). The ranking is utilized in order to address and remedy a conflict between at least two speakers, as discussed below in relation to at least FIGS. 5 and 6. Such conflicts can include, but are not limited to, when at least two participants on a conference both speak at the same time, when one participant is speaking and another participant attempts to speak or interrupt, and the like. The ranking management functionality of the disclosed framework can also generate a queue of "next-in-line" speakers. This queue can be leveraged so as to reserve participants place in line, as discussed in more detail below.

Figure 1:
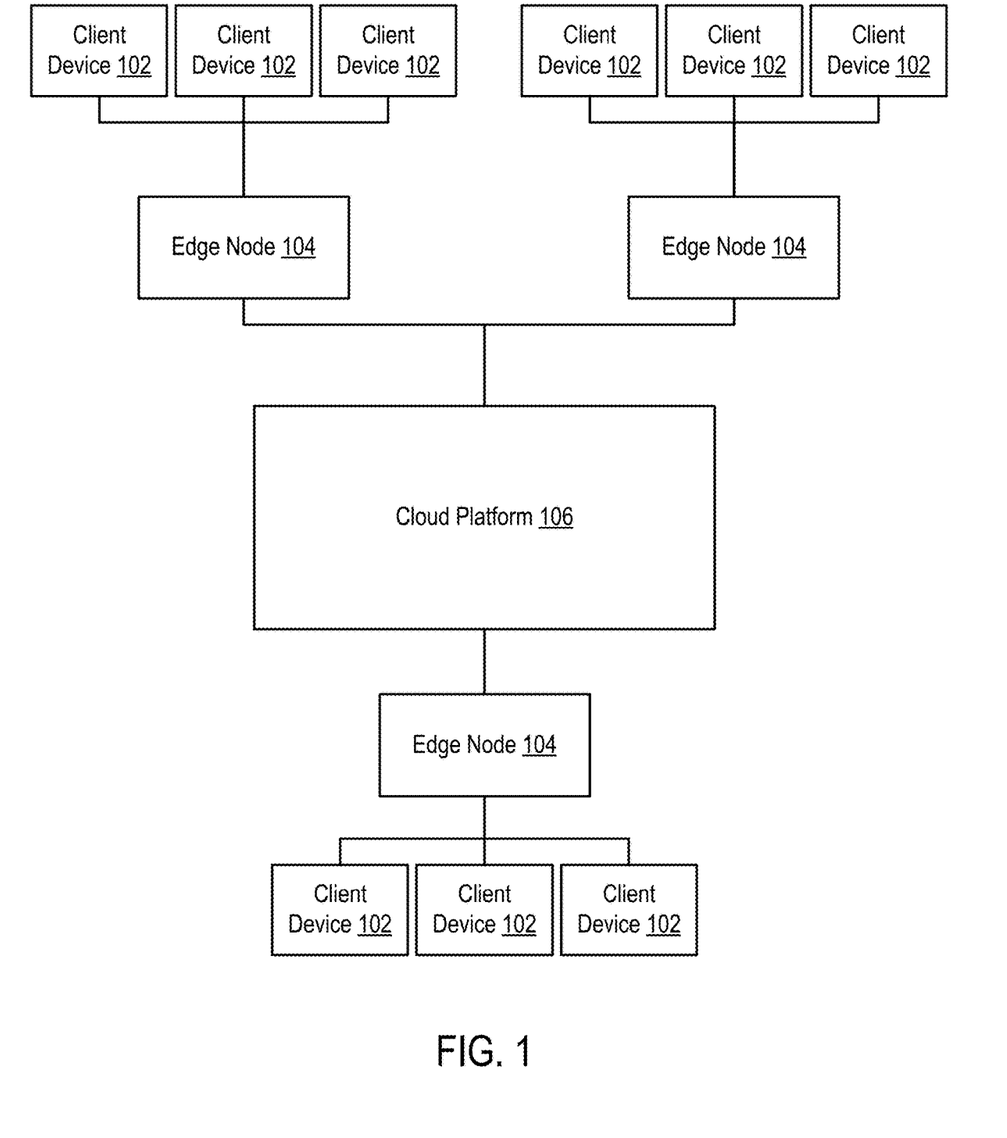
FIG. 1 is a block diagram of a network architecture for prioritizing video conferencing activity according to some embodiments of the present disclosure.

Thus, in some embodiments, the disclosed systems and methods can take the activity in a conference as an input, as well as taking attributes or characteristics about each participant as inputs, and determine a ranking or queue that lists the order of how participants can and will be able to speak in an uninterrupted manner. In some embodiments, the listing can be controlled by a moderator, which in some embodiments can be a user, and in some embodiments can be an engine or module operating on a MEC, on a cloud platform or other component of the disclosed framework, as illustrated in FIG. 1.

In some embodiments, participants can be alerted that it is their time to speak or that they are next in line (or within a proxy position to a speaking opportunity that satisfies the threshold—e.g., the next 2 speakers are alerted to their place in line). In some embodiments, the alert can be a visible interface object or icon displayed within a user interface (UI) portion of a conferencing application. In some embodiments, the alert can be a vibration of a device, a tone, or other audio signal. In some embodiments, the alert can be a combination of an audio, visual and/or haptic effect, and the like.

In some embodiments, alerts can also be provided to participants that indicates which of their traits or activities are impacting their speaking position within the queue. For example, if a user is being "non-active", he/she may receive an alert that indicates their inactivity is causing their place in line to initially be low and/or remain low such that other users are continually placed above them due to their continued inactivity.

In some embodiments, non-speaking participants can have their audio capabilities adjusted to lower their speaking volume, or muted entirely. Thus, when it then becomes their turn, their audio will be turned back on while other non-speaking participants will then be muted. In some embodiments, a speaking participant or a host can toggle the mute and unmute functionality of other participants so that an open dialog can be achieved, yet can be turned off should the speaker or host decide otherwise.

For example, in some embodiments, if a participant is speaking and notices another user is requesting to speak, the speaker can be provided with functionality to unmute the other user; and in some embodiments, the speaker can be provided with functionality to re-mute the other user.

Thus, as discussed herein, the disclosed systems and methods enable a prioritized, conflict-resolution based conferencing environment where orderly conferencing can occur while maintaining each participants' rights to participate accordingly.

In some embodiments, a method is disclosed that comprises analyzing, by a server, over a network, data related to each user participating in a conference session via a conferencing application; determining, by the server, a weighting value for each user based on the analyzed data; determining, by the server, based on each user's weighting value, a ranked queue of speakers for the session; automatically selecting, by the server, a first user from the plurality of users as a current speaker during the session based on the ranked queue, the selection causing the server to automatically adjust audio characteristics of the other users within the plurality of users; and updating, by the server, the ranked queue based on the selection of the first user.

In some embodiments, the method further comprises monitoring, over the network, the session for activity by each of the other users while the first user is selected as speaker; identifying the activity, and determining values for the identified activity for each other user; and updating the ranked queue based on the identified activity and determined values.

In some embodiments, the method further comprises receiving a request from a second user to speak while the first user is selected as speaker; analyzing the updated ranked queue to determine a position of the second user respective to a position of the first user within the updated ranked queue; determining, based on the analyzing, whether to allow or deny the second user's request; and further updating the ranked queue.

In some embodiments, the second user is allowed to speak when the second user's position is higher than the position of the first user within the updated queue, and the second user is not permitted to speak when the second user's position is lower than the position of the first user within the updated queue.

In some embodiments, the method further comprises adjusting audio characteristics of the second user in order to enable the second user to be audible on the session; and adjusting audio characteristics of the first user to render the first user inaudible.

In some embodiments, the method further comprises adjusting audio characteristics of the second user in order to enable the second user to be audible on the session, such that the second user and first user are both capable of speaking during the session.

In some embodiments, the method further comprises receiving a request from a second and third user to speak after the first user is completed speaking, the second user's request being received at a time proximate to the third user's request; identifying positions within the updated ranked queue related to the second and third users; identifying the second or third user as a next speaker based on the identified positions; and updating the ranked queue.

In some embodiments, the method further comprises analyzing the requests of the second and third users; and determining, based on the analysis of the second and third requests, updated weighting values for the second and third users, where the identification of the second and third user as next speaker is additionally based on the updated weighting values.

In some embodiments, the adjustment of the audio signals comprises muting any received audio signals other than the first user's audio signals while the first user is selected as speaker.

In some embodiments, the data of each user comprises information selected from a group consisting of: a user's role during the session, activity during the session, attention during the session, relevance to the session, quality of access, participation in the session, history during the session, and data from a set of previously participated in sessions.

In some embodiments, the determination of the weighting value for a user comprises: identifying a type of the information indicated by the data; and analyzing the type of information, and determining an attribute of the type of information.

In some embodiments, the method further comprises weighting each user's data based on the identified type and the determined attribute, where the weighting value for each user is based on the weighting.

In some embodiments, the method further comprises periodically determining the weighting value for each user during session; and further updating the ranked queue based on the periodic weighting value determinations.

In some embodiments, the method further comprises communicating, over the network, an alert that each of the other users are inaudible upon selection of the first user as the current speaker, the alert being at least one of an audio signal, visual signal and haptic signal.

In some embodiments, a server is disclosed comprising a processor configured to: analyze, over a network, data related to each user participating in a conference session via a conferencing application; determine a weighting value for each user based on the analyzed data; determine based on each user's weighting value, a ranked queue of speakers for the session; automatically select a first user from the plurality of users as a current speaker during the session based on the ranked queue, the selection causing the server to automatically adjust audio characteristics of the other users within the plurality of users; and update the ranked queue based on the selection of the first user.

In some embodiments, a non-transitory computer-readable storage medium for storing instructions capable of being executed by a processor is disclosed. In these embodiments, the instructions are defined by steps of: analyzing, over a network, data related to each user participating in a conference session via a conferencing application; determining a weighting value for each user based on the analyzed data; determining based on each user's weighting value, a ranked queue of speakers for the session; automatically selecting a first user from the plurality of users as a current speaker during the session based on the ranked queue, the selection causing the processor to automatically adjust audio characteristics of the other users within the plurality of users; and updating the ranked queue based on the selection of the first user.

FIG. 1 is a block diagram of a network architecture for prioritizing video conferencing activity according to some embodiments of the present disclosure.

In the illustrated embodiment, client devices (102) communicate with a cloud platform (106) via one or more edge nodes (104). In the illustrated embodiment, the edge nodes (104) can collectively be referred to as the "Edge Cloud," and the cloud platform (106) can be referred to as the "Far Cloud."

The client devices (102) can comprise lightweight computing devices such as, by way of non-limiting example, mobile devices, IoT devices, smart devices, embedded computing devices, and other devices possessing processing and communication capabilities. In general, each of the client devices (102) comprise functionality for loading, accessing and/or opening video and/or audio conferencing applications that enable conferencing with remote users over the Internet.

In some embodiments, an edge cloud can operate to process some (or all) network traffic to and from the client device (102). The edge cloud comprises a plurality of edge nodes (104). An edge node (104) may comprise a computing device such as that depicted in FIG. 7.

In some embodiments, an edge node (104) may comprise a mobile edge computing (MEC) node. In these embodiments, an edge node (104) may comprise a computing device or collection of computing devices that provide a cloud computing system to the client devices (102). In general, the computing devices may comprise server computing devices that comprise any computing device capable of responding to network requests from another computing device (referred to generally as a client) and is not intended to be limited to a specific hardware or software configuration a device.

In some embodiments, the edge nodes (104) may be implemented at the edge of a cellular network. The edge nodes (104) may be situated in a cellular base station or equivalent location. In this embodiment, the edge node (104) may comprise an application server installed within a cellular base station. In some embodiments, the application server is installed in an Evolved Node B or Node B of a 5G or 4G cellular network, respectively.

In some embodiments, an edge node (104) may comprise a physical computing device (e.g., physical server). In other embodiments, an edge node (104) may comprise a virtualized computing platform (e.g., virtual server, container, and the like).

In the illustrated embodiment, multiple edge nodes (104) may be distributed across the network. As described above, each edge node (104) may be situated in or near a cellular base station in one embodiment. In this embodiment, the client devices (102) communicatively coupled to a respective edge node (104) may comprise devices within a cellular coverage area provided by the respective base station. In another embodiment, each edge node (104) may be situated in an internet service provider (ISP) location. In other embodiments, the edge nodes (104) may be situated in other geographically dispersed locations such as wireless access point (WAP) devices.

Figure 2:
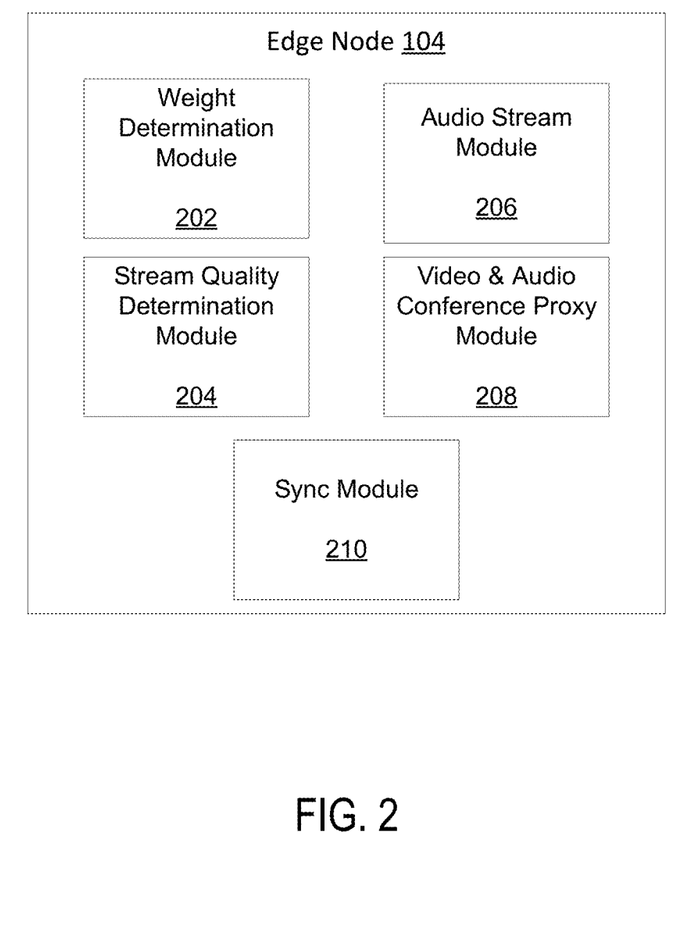
FIG. 2 is a block diagram of a MEC node within an example embodiment of the network architecture of FIG. 1 according to some embodiments of the present disclosure.

In some embodiments, an edge node (104) can include, but is not limited to, a weight determination module (202), stream quality determination module (204), audio stream module (206), video and audio conference proxy module (208) and sync module (210), as depicted in FIG. 2. The modules (202)-(210) of node(s) (104) function, individually and collectively, in order to allocate speakers' priority within an on-going video conference, as discussed in more detail below with reference to FIGS. 4-6.

It should be understood that the modules (or engine(s)) discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

In some embodiments, the edge nodes (104) form part of a cellular network (not illustrated). Thus, in some embodiments, the edge nodes (104) are further connected to various devices of a core network of a cellular network. Details of the operation of a cellular network, especially the packet core of a cellular network, are not described in detail. For example, the pathway between an edge node (104) and the cloud platform (106) may necessarily include data transmitted between various components of a core packet network such as a mobility management entity (MME), package data network gate (PGW), and serving gateway (SGW) in a 5G cellular network. Details of these are not provided, and any cellular packet core network may be utilized.

In the illustrated embodiment, the edge nodes (104) are communicatively coupled to the cloud platform (106). In the illustrated embodiment, the cloud platform (106) may comprise a software-as-a-service (SaaS) platform or other multi-tenanted application running over a network.

Figure 3:
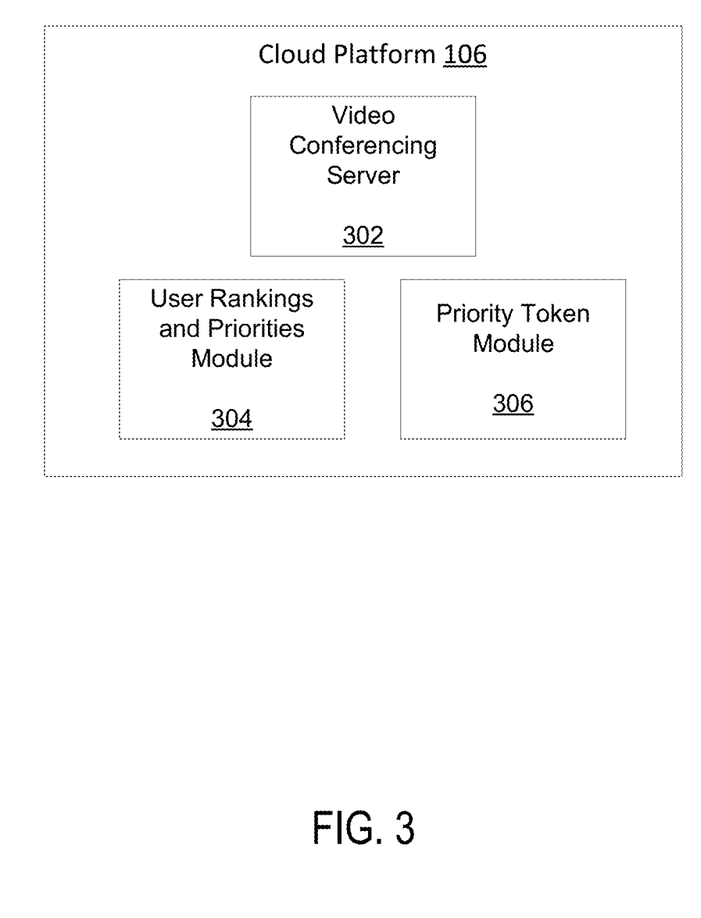
FIG. 3 is a block diagram of a cloud platform within an example embodiment of the network architecture of FIG. 1 according to some embodiments of the present disclosure.

In general, the cloud platform (106) may comprise a single computing device or multiple computing devices providing a network service. In some embodiments, as illustrated in FIG. 3, the cloud platform (106) may present a unified logical view of a video conferencing application hosted and/or provided by video conferencing server (302). Cloud platform (106) can further include, but is not limited to, user rankings and priorities module (304) and priority token module (306). As discussed in more detail below in relation to FIGS. 4-6, module (304) can determine and update user rankings in relation to their speaking priority during a conference, and module (306) generates and/or updates a priority token for users and/or a conferencing session that is utilized by the video conferencing application/session for controlling the allocated speaker queue.

In some embodiments, the cloud platform (106) can provide an API (referred to as the Application API) for accessing functionality offered by the cloud platform (106)—e.g., a video conferencing application and a prioritized queue for speakers within a video conference. The edge nodes (104) are thus capable of calling methods or operations defined by the cloud platform (106) API and transmit data to fulfill those requests.

The preceding description of client devices (102), edge nodes (104), and cloud platform (106) describe the system-level interactions of such components. Each component (102, 104, 106) includes various sub-components not described in detail in the description of FIG. 1, but described in more detail below.

Figure 4:
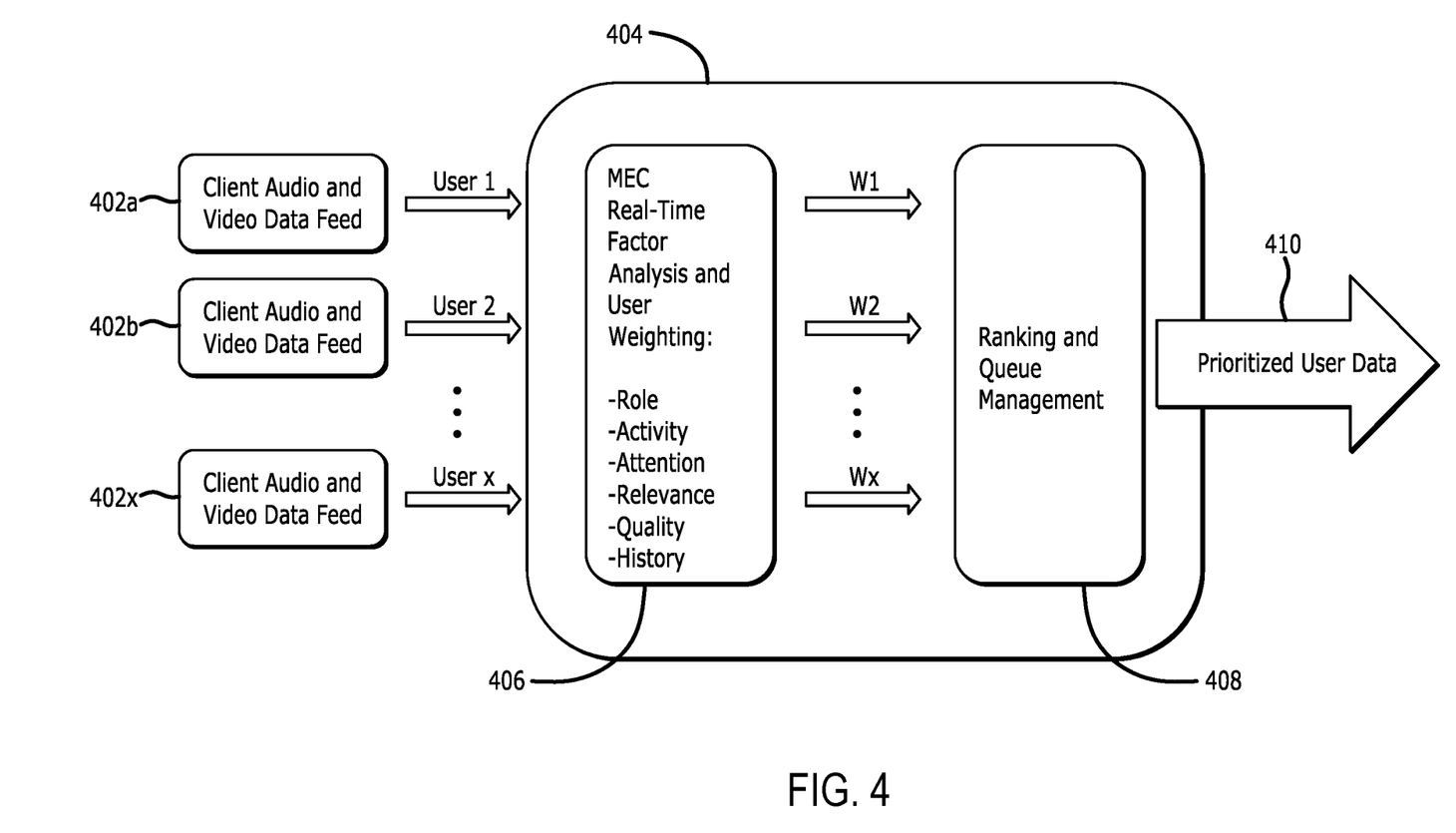
FIG. 4 illustrates a non-limiting example embodiment of a dynamic ranking process according to some embodiments of the present disclosure.

FIG. 4 illustrates an example embodiment of a dynamic ranking process according to some embodiments of the present disclosure.

FIG. 4 illustrates a dynamic ranking process that utilizes the modules (202)-(210) of node(s) 104 and modules (302)-(306) of cloud platform (106) in order to dynamically determine a prioritized ranking of a user. As discussed above, and herein in more detail, the modules (202)-(210) of node(s) (104) function in order to determine an allocation of speakers' priority within a conference. Module (304) of platform (106) can store and update user rankings in relation to their determined speaking priority during a conference, and module (306) generates and/or provides a priority token to users within a conferencing session that is utilized by the video conferencing application/session for controlling the allocated speaker queue.

In the illustrated embodiment of FIG. 4, audio and video (A/V) data for participants (or clients) of a video call can be collected and/or identified, as referenced as items (402a-402x). These items correspond to the A/V data for User 1, User 2, . . . User X, respectively, as depicted in FIG. 4.

As discussed above, the data (402a-402x) can involve multiple pre-determined and/or dynamically determined participant factors, which can be determined, derived, retrieved, observed, calculated or otherwise identified by a MEC (e.g., node(s) (104)). Such factors, which are weighting factors, can be determined by module (202) and/or modules (204)-(208). Upon determination of these factors and the ranked queue, the factors, their values and the ranked queue are synced with platform (106) via sync module (210) so that a prioritized listing is stored, updated or otherwise maintained (via module (304)). The video conferencing server (302) (of platform (106)) can then generate (or update) or compile a token, via token module (306), which is then passed the host (e.g., a moderator) or each participant, where the token relays the rankings or queue (that is maintained and updated by module (304)) so that participants' speaking turns can be managed.

As mentioned above, according to some embodiments, factors for ranking a queue of participants/speakers can be based on, but is not limited to: pre-call role priority weight; activity fairness weighting; "non-winning" or lower ranked speaker value; host override; voice quality weight; attention metric weights; relevance metrics; "hand raised" or other notifications of a request to speak; inactivity or non-usage of speaking opportunities; mobility state, and the like, or some combination thereof. The details of each factor are discussed below:

According to some embodiments, a pre-call role priority weight is a value that is determined before the call or conference has begun and is based on attributes, traits or characteristics of each of the participants. For example, this weight can be based on job level or expertise (e.g., executive vs manager vs subject matter expert vs listener invite, and the like) of the participant. In some embodiments, this information can be provided by the participant, retrieved from the video conferencing application or a separate network or application (e.g., a user profile), or provided by a host of the conference. In some embodiments, this value can be determined or identified by module (202).

In some embodiments, activity fairness weighting can be based on participant speaking time. This weighting value can vary during the call, and can periodically be polled to determine its value. For example, a person who has spoken the least can accumulate a higher weight value versus a person who has spoken the most or taken the most time during the call. In some embodiments, this ranking value can be impacted by a running time or specific part of a call (e.g., the last portion (e.g., 10 minutes) of a call versus the beginning of the call). In some embodiments, this ranking value can be influenced, adjusted or based on a person's speaking time percentages for a specific call or a set of calls. In some embodiments, this value can be determined or identified by module (202) and/or module (208).

In some embodiments, a "non-winning" or lower ranked speaker(s) value can correspond to a last/previous voice conflict. That is, if a participant was muted (or lost a conflict) with another user, then he/she may be weighted differently so as to mute him/her again in another conflict, or mute the other person in a subsequent conflict since the user was already muted in a last conflict. In some embodiments, this value can be determined or identified by module (202) and/or module (208).

In some embodiments, a host override value can be utilized. This can enable the host, or organizing person, entity or company (and its members) to have priority over others on the call. This can impact the "non-winning" value, for example, since a host can interrupt and/or override a user causing them to lose conflicts thereby affecting their weights either negatively or positively. In some embodiments, this value can be determined or identified by module (208).

In some embodiments, a voice quality weight can be utilized. In some embodiments, a video quality value can be also or alternatively utilized. For example, a voice/video quality that is poor (e.g., audio cannot be understood or the video cannot be clearly viewed) can cause a lower weight value to be applied, and one that is high-quality can cause a higher weight value. In some embodiments, this value can be determined or identified by module (206) and/or module (208).

In some embodiments, the voice (and/or audio) quality weight can be based on MEC processing of the voice and/or video data, and feedback from others. In some embodiments, MEC processing can involve, for example, a mean opinion score (MOS). In some embodiments, a speaker quality feedback value can be identified based on other audience members feedback while a participant is actively speaking.

In some embodiments, a mobility state weight can be based on a state of a user's mobile device. This can be determined, recorded or received via the gyroscope, accelerometer, GPS and/or other application data that indicates movement or activity taking part on, by and or with the device. For example, if the user is in a car or driving (e.g., moving at a certain speed while using a maps application), this may indicate the user may be distracted, where their priority can be adjusted accordingly (lowered to avoid unnecessary distractions while driving). In some embodiments, this value can be determined or identified by module (202) and/or module (208).

In some embodiments, an attention metric weight can be based on an analysis of a participant's visual video and audio response. This can involve analyzing the image frames of the streaming video of the conference and determining how a participant's speaking session is being received. For example, facial expressions, eye tracking, shoulder movement, biometrics, face/ear/skin color and temperature change, and the like can be detected and scored to determine how a user is being received by an audience. In some embodiments, this value can be determined or identified by module (206) and/or module (208).

In some embodiments, analysis of an audience (e.g., each listening/non-speaking participant) to a speaking participant can be performed by any known or to be known image analysis technique, algorithm, classifier or mechanism, including, but not limited to, computer vision, Bayesian network analysis, Hidden Markov Models, artificial neural network analysis, logical model and/or tree analysis, and the like.

In some embodiments, relevance metrics can be based on topics being discussed. In some embodiments, natural language processing (NLP) can be implemented to determine this weighting factor. In some embodiments, this value can be determined or identified by module (206) and/or module (208).

And, in some embodiments, a "hand-raised" weighting factor can be utilized to determine a value as to whether a user desires to speak or is requesting to speak. This form of notification of a request to speak is non-limiting, and is only an example. Such notification and similar types of notifications to speak can be analyzed to determine if they are accepted or ignored, which will impact the weighting value. In some embodiments, this value can be determined or identified by module (206), module (208) and/or module (210).

Thus, as illustrated in FIG. 4, the data (e.g., factors (402a-402x) of Users 1-User x are compiled by a ranking engine (404), where the MEC analysis and weighting is performed (406) so that the ranking and queue management (408) is determined, which leads to the prioritized user data listing (410). The calculations performed in the weighting (406) and queue management (408) component of engine (404) in order to output the prioritized user data (410) are discussed in detail below in relation to FIG. 5.

Figure 5:
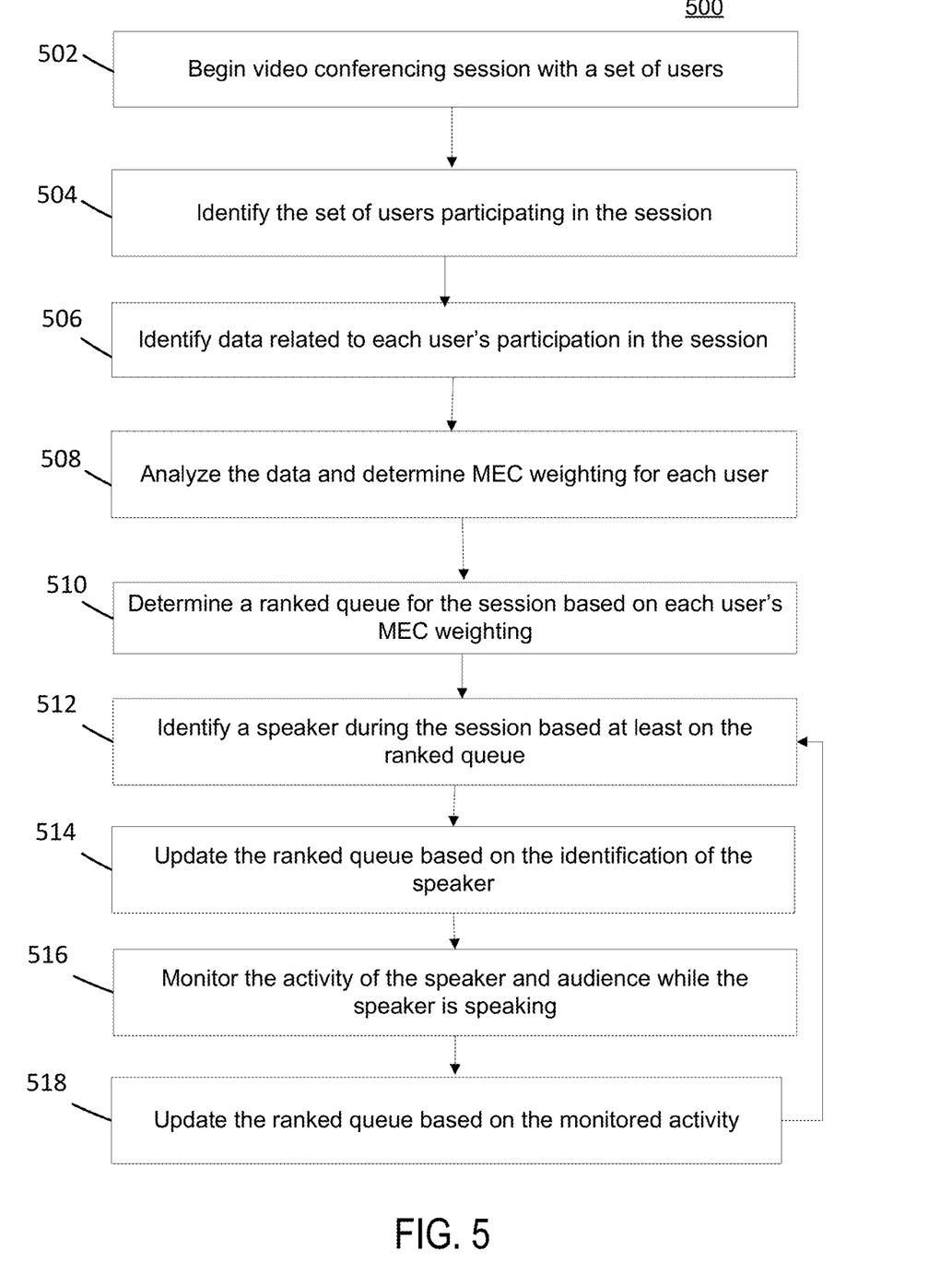
FIG. 5 is a block diagram illustrating an exemplary data flow for queue ranking management according to some embodiments of the present disclosure.

FIG. 5 depicts a non-limiting example embodiment of a method (500) for queue ranking management of a prioritized user data listing (410). As discussed herein, method (500) details how the ranked queue is compiled, which can then be used by the host or video conferencing application to control and/or manage speakers during a conference.

Method (500) begins with Step (502) where a set of users open, log into and initiate a video conference session via a video conferencing application. The session can be provided by any type of known or to be known video conferencing technology that enables users to interact, view and speak with other users via an application executing via their personal devices (e.g., a desktop or mobile device).

In some embodiments, Step (502) can be performed at the scheduled time of the session, when a threshold satisfying amount of users joins the session, when the host joins the session, or as each user joins, and the like, or some combination thereof.

In Step (504), the set of users are identified. This identification enables the attributes, characteristics, traits and overall data and metadata about the users and their associated session information to be identified, as in Step (506). The data related to a user's session can include any of the weighting factors outlined above in relation to FIG. 4.

Moreover, such data can include, but is not limited to, a user's role during the session, activity during the session, attention during the session, relevance to the session, quality of access and participation in the session (e.g., the A/V traits of their connection and streamed input), history during the session and/or from other sessions, mobility state data, and the like, or some combination thereof. In some embodiments, the data, or at least a portion of the data, can be predetermined prior to the session commencing (in Step (502)). In some embodiments, the data, or at least a portion of, can be dynamically or periodically determined as the session is taking place, as discussed above.

Having identified each user in the session (from Step (504)) and their associated data (Step (506)), the method (500) proceeds to Step (508), where the data for each user is analyzed and MEC weighting factors and values for each user are determined. An example of this is illustrated in FIG. 4, as discussed above.

In some embodiments, the analysis performed in Step (508) can be performed by any known or to be known image analysis technique, algorithm, classifier or mechanism, including, but not limited to, computer vision, Bayesian network analysis, Hidden Markov Models, artificial neural network analysis, logical model and/or tree analysis, and the like.

In Step (510), a ranked queue is determined for the session based on each user's MEC weighting factor(s). In illustrative embodiments, the user's with the highest overall weights indicate the user's with the most viable opportunities to speak (e.g., reasons to speak and be heard); therefore, they can be ranked highest within the queue. As discussed above and in more detail below, as the session commences and continues, and speakers engage and audience members' activities are analyzed, the queue can be updated (e.g., Steps (512)-(518), as discussed below).

By way of a non-limiting example, a video conference session (or meeting) has 3 participants: Bob, Jane and Joe. Bob, the CEO of the company, is the host of the meeting and his A/V stream is poor quality because he is joining from off-site via his mobile phone. Jane, the head of human resources (HR) is joining from her office and her A/V is high-quality, and her history is of being a very active speaker given her role in the company. And, Joe, is a mid-level employee who is presenting to Bob and Jane.

According to some embodiments, method (500) involves analyzing the values associated with Bob, Jane and Joe's connection, past activity and role within the company and within the session, and determining MEC weighting values for each. By way of a non-limiting example, Bob's overall weighting could be high despite his low A/V factors given that he runs the company. Joe is also high because he is presenting to both Bob and Jane. Jane's weighting value could be high given her history and role, however, she would most likely rank third behind Joe then Bob because of her less active roll.

According to some embodiments, the ranked queue generated/compiled in Step (510) can be a product of a calculation for ranking based on weight factors (e.g., the factors determined in Step (508)):

$$\text{Rank value per attendee (RVA)} = A * \text{Function}(X) / \text{Function}(Y), \quad \text{(Equation 1)}.$$

Where, Constant A corresponds to direct multiplier values (e.g., role, moderator, override, MOS, and the like);

Function (X)=Factors that increase speaking opportunity (e.g., speaker engagement factor (SEF), non-speaking time, time cut-off by others, and the like); and Function (Y)=Factors in which reduce speaking opportunity (e.g., attendees attention factor (AAF—e.g., eye tracking, facial expression, head nodding, screen eyes focus time, and the like), speaking total time, interruption factor, and the like).

In some embodiments, having determined RVA for each user in the session, a participant priority ranking (PPR) (Step (510)) can be determined by:

$$\text{PPR} = \text{Inputs} * \text{RVA} * \text{Weight \%}, \quad \text{(Equation 2)}.$$

The below table (Table 1) illustrates example embodiments of PPR components:

| Inputs | Rank Value Per Attendee | Weight Percentage (Example) |
| --- | --- | --- |
| Role/Historical Priority | Based on Equation 2 | 20% |
| MOS | Based on Equation 2 | 15% |
| Speaking Time | Based on Equation 2 | 10% |
| Stream Quality | Based on Equation 2 | 10% |
| Participant Engagement | Based on Equation 2 | 15% |
| Jitter | Based on Equation 2 | 10% |
| Radio Access Technology (RAT) Type (4G/5G) | Based on Equation 2 | 10% |
| Visual Cues | Based on Equation 2 | 10% |
| Total |  | 100% |

In some embodiments, the weight percentage (%) can be dynamically adjusted based on moderator settings and/or based on analysis (e.g., either current or historical) of participants' activity or experience within this and other sessions.

In some embodiments, a priority buffer can be inserted into audio packets received from several participants based on participant priority (as indicated in the ranked queue). The buffer length may be utilized to accommodate only one (1) participant, in which case other participants' audio packets can be dropped (e.g., muted).

Turning back to FIG. 5, after Step (510) where the ranked queue is determined, method (500) proceeds to Step (512) where a speaker is identified from the queue. This speaker can have a priority buffer added to his/her audio packets. In some embodiments, this buffer can be allocated via the token provided by module (306) of platform (106).

In some embodiments, the top selected user within the queue is selected. In some embodiments, other factors can be taken into account, such as, for example, the role of the user within the company or within the call. For example, if the session has just started and the floor is open, and Joe is the highest ranked speaker, method (500) may still select Bob since he is the CEO. This will enable Bob to "open the meeting" then move to Joe for his presentation.

Thus, in some embodiments, not only can the weighting factors of the users be accounted for, but the factors surrounding the context of what is being presented or spoken about during one or more portions of the conference session can be factored when deciding who is currently allocated a speaking role within a session. For example, if the context of a conference or portion of a conference is related to a specific topic, a user denoted or understood to be an "expert" in that topic can be weighted more in order for them to have priority over others that are not considered experts. For example, if a company holds a conference to discuss budgeting, then representatives from the accounting department can be weighted accordingly based on the topic being discussed.

In some embodiments, upon selecting the speaker, a grace period is applied prior to the speaker being provided the ability to speak (or before the user is unmuted). The grace period can be a predetermined period of time (e.g., 2 seconds) and can be enabled via the priority buffer. In some embodiments, during the grace period, the selected user's inputs (from Table 1) can be re-analyzed or re-weighted. This analysis ensures that the speaker's inputs have maintained a value that ensures the speaker is able to speak and capable of being clearly heard—for example, his/her audio quality has not worsened to a level where other users on the conference cannot hear or clearly understand him/her.

At the conclusion of the grace period, if the inputs are below a threshold level (e.g., the MEC determines that they cannot be resolved on the network side—for example, the audio values cannot be improved by allocating more bandwidth), then a next user within the queue is selected. A grace period can then be applied to this user.

In Step (514), the ranked queue is updated based on the selection of a speaker in Step (512). In some embodiments, execution of Step (512) causes the selected speakers weighting values to be updated in a similar manner as discussed above in relation to Step (508). In some embodiments, all of the users within the session can have their weighting values updated based on selection in Step (512). Thus, based on the updated weighting factors of the speaker and/or all users, the ranked queue is updated based on the updated factors for each user and the session.

Method (500) then proceed to Step (516) where activity of the speaker and each other user (e.g., the audience) are monitored. Such monitoring, as discussed above, contributes to updated weighting factors, as requests to speak, and image analysis of each user's actions (e.g., eye movement), and the like, are captured and analyzed. Based on this monitoring, and detected and updated weighting factors for the users, an updated ranked listing is compiled. Step (518). Such compilation is performed in a similar manner as discussed above in relation to Step (510).

Method (500) includes a feedback loop from Step (518) to Step (512), where a speaker can be selected based on the most recently updated ranking. This enables the most relevant speaker to take the floor during a session without the worry or need for him/her to deal with or handle an interruption.

For example, continuing with the Bob, Jane and Joe example from above: Bob is initially selected to speak to introduce Joe, who then begins speaking. From analysis of Bob's screen, it is determined that he is not paying attention and is focusing on something else (e.g., his eyes are not focused on the screen for a threshold satisfying period of time). Therefore, these factors can contribute to his weighting values being lowered to enable Jane to leap him in the ranked listing.

Therefore, according to illustrative embodiments, method (500) of FIG. 5 provides a computer-implemented process for determining which users have priority to speak during a call. This determination is embodied as a ranked queue (e.g., a stored stack data structure within the cache of the cloud platform (106)—module (304), for example) that is dynamically updated as the conference session is monitored and users interact, speak and request to speak during the session.

Figure 6:
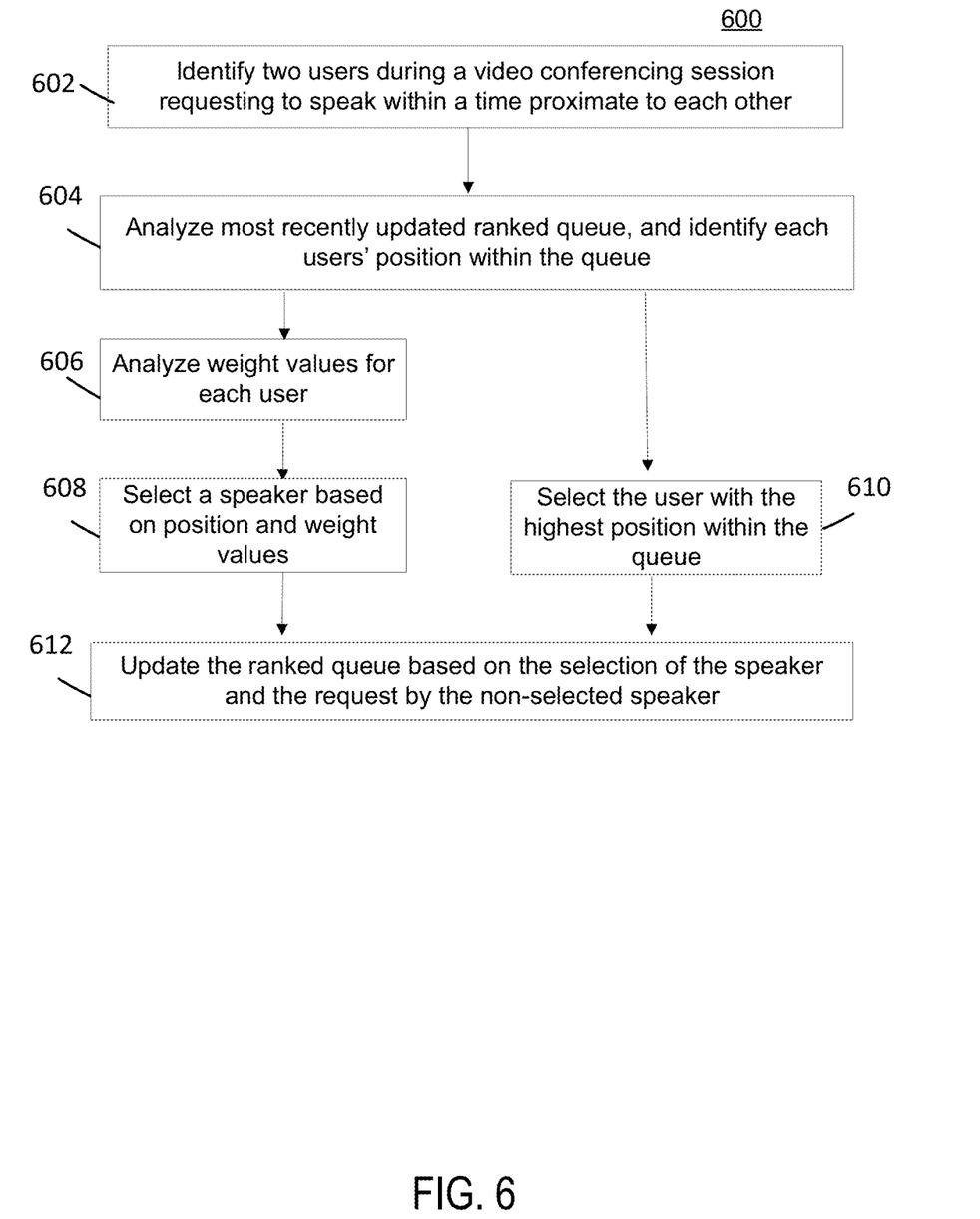
FIG. 6 is a block diagram illustrating an exemplary data flow of a process conflict response based on the queue ranking management of FIG. 5 in accordance with some embodiments of the present disclosure.

Turning to FIG. 6, method (600) details a non-limiting example embodiment for addressing and remedying a conflict between two users during a video conference session. For purposes of this discussion, the conflict will be discussed in relation to two (2) users; however, it should be construed as limiting, as any number of users can have a conflict (e.g., attempt to speak at the same time or interrupt each other) without departing from the scope of the instant disclosure.

Method (600) begins with Step (602) where two users participating in a video conferencing session request to speak within a time proximate each other.

For example, using the Bob, Jane and Joe example above, if Bob is speaking, Joe may attempt to speak and add some context to what Bob is currently saying because he is the subject matter expert.

Method (600) operates via the same functionality for when Bob and Joe request to speak at the same time. For example, Bob and Joe are requesting to speak at the same time (or a time proximate to each other), and engine 300 needs to resolve the conflict among them and determine who has the right/permission to speak.

According to some embodiments, the time proximate can involve, but is not limited to, one user attempting to interrupt another user who is currently speaking or one who "has the floor" (e.g., a speaker selected in Step (512) of method (500)), when two users attempt to speak at the same time (e.g., they both begin speaking within a threshold satisfying time of one another, for example, within 3 seconds of one another), and the like.

Upon identifying a conflict of the two users, method (600) continues to Step (604) where the most recently updated ranked queue is retrieved and analyzed. From the analysis, the position within the queue for each requesting user is identified.

For example, if Joe is attempting to interrupt Bob, Bob would be in the first position because he is the selected speaker and Joe could be in position 2 (e.g., given his role and ranking of factors).

According to some embodiments, method (600) can continue in two paths from Step (604): Path one—Steps (610) and (612); and Path two—Steps (606), (608) and (612).

Path one involves determining that the user with the highest position within the queue takes priority, and causing the other user to be muted. Step (610). In some embodiments, as discussed above, a notification can visibly or audibly be provided to the user being muted and/or all users that the muted user is being denied an opportunity to speak. In some embodiments, the grace period discussed above can be applied to ensure that the MEC can determine that the selected user's inputs maintain their viability level for speaking on the conference.

For example, according to some embodiments, user Joe could continually be muted (have his request to speak be denied, and have his audio packets dropped), and Bob would continue to speak uninterrupted.

The queue, however, can be updated to reflect this activity. Step (612). This update is based on the factors identified in Steps (602), (604) and (610), and can increase the muted user's chances of speaking next given his/her attempt to interrupt the current speaker. Alternatively, if he/she has been attempting to interrupt other speakers for a threshold satisfying number of times (either during this call or historically), it can negatively impact his/her weighting and position within the queue.

Turning back to Step (604), method (600) can alternatively proceed on Path two, where in addition to identifying the position of each user within the most updated queue, the weighting factors of each user can be identified. Step (606). In Step (608), calculations similar to those performed in Equations 1 and 2 can be computed, where the position of a user within a queue can be leveraged as a factor of Function (X), which can cause the queue to be recompiled at the onset of the conflict detected in Step (602). As a result, Step (608) can select a speaker based on the updated queue ranking/values. In some embodiments, the grace period discussed above can be applied to ensure that the MEC can determine that the selected user's inputs maintain their viability level for speaking on the conference.

From here, method (600) can proceed to Step (612) in a similar manner as discussed above.

For example, according to some embodiments, the ranked listing can be recompiled since Joe is considered the subject matter expert, and given the context of what Bob is discussing, it may be vital for Joe to interject.

In some embodiments, where an interruption is granted, the initial user may be muted for a predetermined period of time while the interrupter speaks. At the conclusion of the period of time, the initial person is granted access to speak while the interrupter is then muted again.

In some embodiments, the interrupter may be granted access to speak (e.g., be unmuted), which can cause both the initial speaker and interrupter to both be unmuted. In some embodiments, this can cause the buffer to be increased to two (from one) and added to both speakers' audio signals.

In some embodiments, if a user is interrupted, an interrupted factor is added to that user's RVA which would increase the opportunity for the user to speak next.

Thus, according to illustrative embodiments, method (600) of FIG. 6 provides mechanisms for a conferencing application, platform or service to automatically and dynamically identify speaking conflicts between users and address (or resolve) them in a seamless manner that enables the conference to continue without two or more users speaking at the same time, unintentionally, thereby avoiding confusion and delay.

Figure 7:
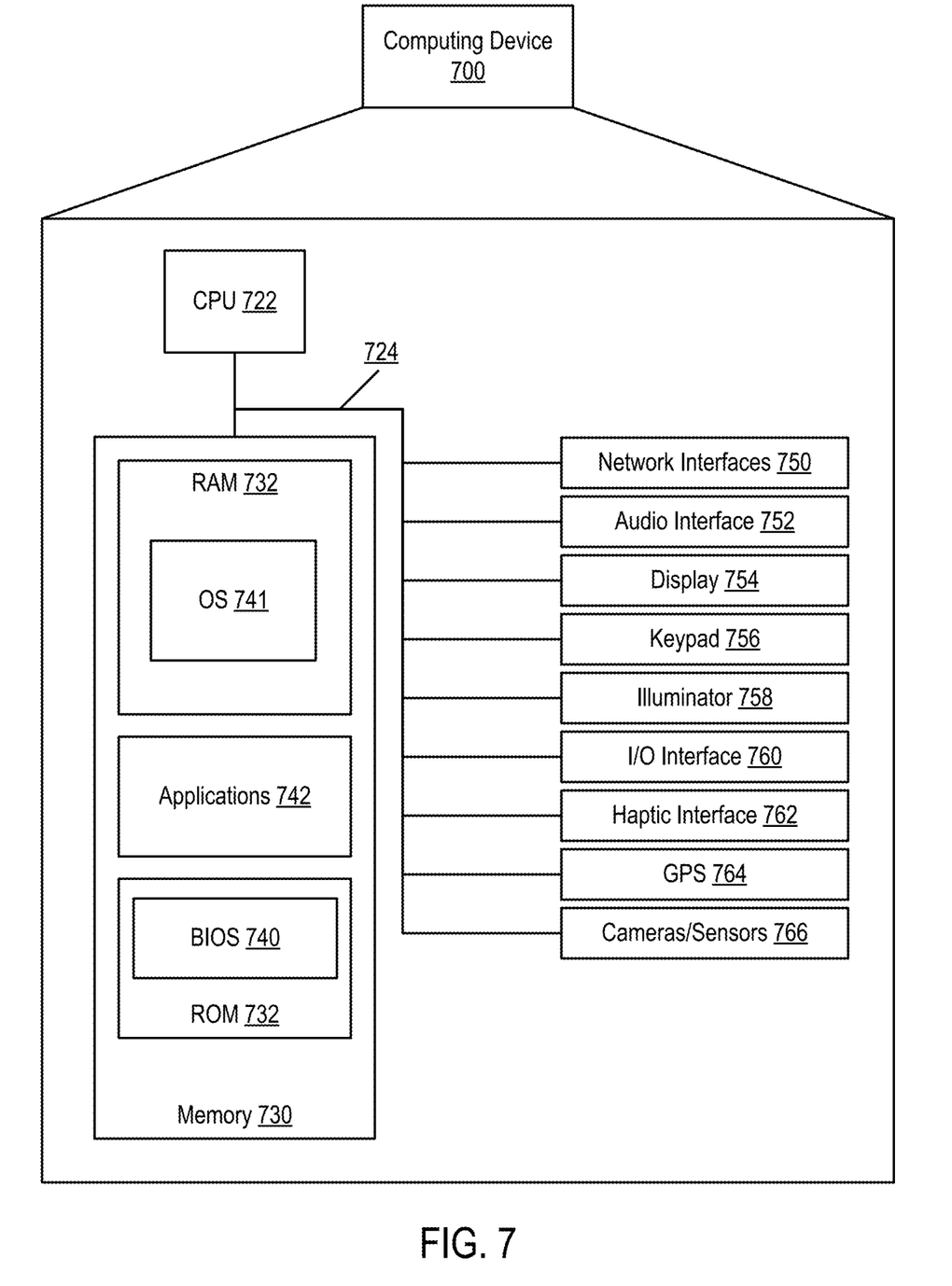
FIG. 7 is a block diagram illustrating a computing device showing an example of a client or server device used in various embodiments of the present disclosure.

FIG. 7 is a block diagram illustrating a computing device showing an example of a client or server device used in the various embodiments of the disclosure.

The computing device (700) may include more or fewer components than those shown in FIG. 7, depending on the deployment or usage of the device (700). For example, a server computing device, such as a rack-mounted server, may not include audio interfaces (752), displays (754), keypads (756), illuminators (758), haptic interfaces (764), Global Positioning Service (GPS) receivers (764), or cameras/sensors (766). Some devices may include additional components not shown, such as graphics processing unit (GPU) devices, cryptographic co-processors, artificial intelligence (AI) accelerators, or other peripheral devices.

As shown in FIG. 7, the device (700) includes a central processing unit (CPU) (722) in communication with a mass memory (730) via a bus (724). The computing device (700) also includes one or more network interfaces (750), an audio interface (752), a display (754), a keypad (756), an illuminator (758), an input/output interface (760), a haptic interface (762), an optional global positioning systems (GPS) receiver (764) and a camera(s) or other optical, thermal, or electromagnetic sensors (766). Device (700) can include one camera/sensor (766) or a plurality of cameras/sensors (766). The positioning of the camera(s)/sensor(s) (766) on the device (700) can change per device (700) model, per device (700) capabilities, and the like, or some combination thereof.

In some embodiments, the CPU (722) may comprise a general-purpose CPU. The CPU (722) may comprise a single-core or multiple-core CPU. The CPU (722) may comprise a system-on-a-chip (SoC) or a similar embedded system. In some embodiments, a GPU may be used in place of, or in combination with, a CPU (722). Mass memory (730) may comprise a dynamic random-access memory (DRAM) device, a static random-access memory device (SRAM), or a Flash (e.g., NAND Flash) memory device. In some embodiments, mass memory (730) may comprise a combination of such memory types. In one embodiment, the bus (724) may comprise a Peripheral Component Interconnect Express (PCIe) bus. In some embodiments, the bus (724) may comprise multiple busses instead of a single bus.

Mass memory (730) illustrates another example of computer storage media for the storage of information such as computer-readable instructions, data structures, program modules, or other data. Mass memory (730) stores a basic input/output system ("BIOS") (740) for controlling the low-level operation of the computing device (700). The mass memory also stores an operating system (741) for controlling the operation of the computing device (700)

Applications (742) may include computer-executable instructions which, when executed by the computing device (700), perform any of the methods (or portions of the methods) described previously in the description of the preceding Figures. In some embodiments, the software or programs implementing the method embodiments can be read from a hard disk drive (not illustrated) and temporarily stored in RAM (732) by CPU (722). CPU (722) may then read the software or data from RAM (732), process them, and store them to RAM (732) again.

The computing device (700) may optionally communicate with a base station (not shown) or directly with another computing device. Network interface (750) is sometimes known as a transceiver, transceiving device, or network interface card (NIC).

The audio interface (752) produces and receives audio signals such as the sound of a human voice. For example, the audio interface (752) may be coupled to a speaker and microphone (not shown) to enable telecommunication with others or generate an audio acknowledgment for some action. Display (754) may be a liquid crystal display (LCD), gas plasma, light-emitting diode (LED), or any other type of display used with a computing device. Display (754) may also include a touch-sensitive screen arranged to receive input from an object such as a stylus or a digit from a human hand.

Keypad (756) may comprise any input device arranged to receive input from a user. Illuminator (758) may provide a status indication or provide light.

The computing device (700) also comprises an input/output interface (760) for communicating with external devices, using communication technologies, such as USB, infrared, Bluetooth™, or the like. The haptic interface (762) provides tactile feedback to a user of the client device.

The optional GPS transceiver (764) can determine the physical coordinates of the computing device (700) on the surface of the Earth, which typically outputs a location as latitude and longitude values. GPS transceiver (764) can also employ other geo-positioning mechanisms, including, but not limited to, triangulation, assisted GPS (AGPS), E-OTD, CI, SAI, ETA, BSS, or the like, to further determine the physical location of the computing device (700) on the surface of the Earth. In one embodiment, however, the computing device (700) may communicate through other components, provide other information that may be employed to determine a physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

To the extent the aforementioned implementations collect, store, or employ personal information of individuals, groups, or other entities, it should be understood that such information shall be used in accordance with all applicable laws concerning the protection of personal information. Additionally, the collection, storage, and use of such information can be subject to the consent of the individual to such activity, for example, through well known "opt-in" or "opt-out" processes as can be appropriate for the situation and type of information. Storage and use of personal information can be in an appropriately secure manner reflective of the type of information, for example, through various access control, encryption, and anonymization techniques (for especially sensitive information).

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

What is claimed is:

1. A method comprising:
analyzing, by a server, over a network, data related to each user, of a plurality of users, participating in a conference session via a conferencing application;
determining, by the server, a weighting value for each user based on the analyzed data, wherein the weighting value for a respective user is based on a weighting of the respective user's data that is based on a type of information indicated by the respective user's data, an attribute of the type of information and dynamically-adjustable weight corresponding to the type of information;
determining, by the server, based on each user's weighting value, a ranked queue of speakers for the session;
automatically selecting, by the server, a first user from the plurality of users as a current speaker during the session based on the ranked queue, said selection causing the server to automatically adjust audio characteristics of the other users within the plurality of users; and
updating, by the server, the ranked queue based on the selection of the first user.

2. The method of claim 1, further comprising:
monitoring, over the network, the session for activity by each of the other users while the first user is selected as speaker;
identifying the activity, and determining values for the identified activity for each other user; and
updating the ranked queue based on the identified activity and determined values.

3. The method of claim 2, further comprising:
receiving a request from a second user to speak while the first user is selected as speaker;
analyzing the updated ranked queue to determine a position of the second user respective to a position of the first user within the updated ranked queue;
determining, based on the analyzing, whether to allow or deny the second user's request; and
further updating the ranked queue.

4. The method of claim 3, wherein the second user is allowed to speak when the second user's position is higher than the position of the first user within the updated queue, and wherein the second user is not permitted to speak when the second user's position is lower than the position of the first user within the updated queue.

5. The method of claim 3, further comprising:
adjusting audio characteristics of the second user in order to enable the second user to be audible on the session; and
adjusting audio characteristics of the first user to render the first user inaudible.

6. The method of claim 3, further comprising:
adjusting audio characteristics of the second user in order to enable the second user to be audible on the session, such that the second user and first user are both capable of speaking during the session.

7. The method of claim 1, further comprising:
receiving a request from a second and third user to speak after the first user is completed speaking, the second user's request being received at a time proximate to the third user's request;
identifying positions within the updated ranked queue related to the second and third users;
identifying the second or third user as a next speaker based on the identified positions; and
updating the ranked queue.

8. The method of claim 7, further comprising:
analyzing the requests of the second and third users; and
determining, based on said analysis of the requests of the second and third requests users, updated weighting values for the second and third users, wherein said identification of the second and third user as next speaker is additionally based on said updated weighting values.

9. The method of claim 1, wherein adjustment of the audio signals comprises muting any received audio signals other than the first user's audio signals while the first user is selected as speaker.

10. The method of claim 1, wherein the data of each user comprises information selected from a group consisting of: a user's role during the session, activity during the session, attention during the session, relevance to the session, quality of access, participation in the session, history during the session, and data from a set of previously participated in sessions.

11. The method of claim 1, wherein the determination of the weighting value for the respective user comprises:
identifying the type of the information indicated by the respective user's data; and
analyzing the type of information, and determining the attribute of the type of information.

12. The method of claim 1, further comprising:
periodically determining the weighting value for each user during session; and
further updating the ranked queue based on the periodic weighting value determinations.

13. The method of claim 1, further comprising:
communicating, over the network, an alert that each of the other users are inaudible upon selection of the first user as the current speaker, the alert being at least one of an audio signal, visual signal and haptic signal.

14. A server comprising:
a processor configured to:
analyze, over a network, data related to each user, of a plurality of users, participating in a conference session via a conferencing application;
determine a weighting value for each user based on the analyzed data, wherein the weighting value for a respective user is based on a weighting of the respective user's data that is based on a type of information indicated by the respective user's data, an attribute of the type of information and a dynamically-adjustable weight corresponding to the type of information;
determine based on each user's weighting value, a ranked queue of speakers for the session;
automatically select a first user from the plurality of users as a current speaker during the session based on the ranked queue, said selection causing the server to automatically adjust audio characteristics of the other users within the plurality of users; and
update the ranked queue based on the selection of the first user.

15. The server of claim 14, further comprising:
monitor, over the network, the session for activity by each of the other users while the first user is selected as speaker;
identify the activity, and determine values for the identified activity for each other user;
update the ranked queue based on the identified activity and determined values;
receive a request from a second user to speak while the first user is selected as speaker;
analyze the updated ranked queue to determine a position of the second user respective to a position of the first user within the updated ranked queue;
determine, based on the analyzing, whether to allow or deny the second user's request; and
further update the ranked queue.

16. The server of claim 14, further comprising:
receive a request from a second and third user to speak after the first user is completed speaking, the second user's request being received at a time proximate to the third user's request;
identify positions within the updated ranked queue related to the second and third users;
identify the second or third user as a next speaker based on the identified positions; and
update the ranked queue.

17. A non-transitory computer-readable medium tangibly encoded with instructions, that when executed by a processor, perform a method comprising:
analyzing, over a network, data related to each user, of a plurality of users, participating in a conference session via a conferencing application;
determining a weighting value for each user based on the analyzed data, wherein the weighting value for a respective user is based on a weighting of the respective user's data that is based on a type of information indicated by the respective user's data, an attribute of the type of information and a dynamically-adjustable weight corresponding to the type of information;
determining based on each user's weighting value, a ranked queue of speakers for the session;
automatically selecting a first user from the plurality of users as a current speaker during the session based on the ranked queue, said selection causing the processor to automatically adjust audio characteristics of the other users within the plurality of users; and
updating the ranked queue based on the selection of the first user.

18. The non-transitory computer-readable medium of claim 17, further comprising:
monitoring, over the network, the session for activity by each of the other users while the first user is selected as speaker;
identifying the activity, and determine values for the identified activity for each other user;
updating the ranked queue based on the identified activity and determined values;
receiving a request from a second user to speak while the first user is selected as speaker;
analyzing the updated ranked queue to determine a position of the second user respective to a position of the first user within the updated ranked queue;
determining, based on the analyzing, whether to allow or deny the second user's request; and
further updating the ranked queue.

19. The non-transitory computer-readable medium of claim 17, further comprising:
receiving a request from a second and third user to speak after the first user is completed speaking, the second user's request being received at a time proximate to the third user's request;
identifying positions within the updated ranked queue related to the second and third users;
identifying the second or third user as a next speaker based on the identified positions; and
updating the ranked queue.

* * * * *